United States Patent
Park et al.

(10) Patent No.: US 11,455,195 B2
(45) Date of Patent: Sep. 27, 2022

(54) WORKLOAD-BASED COGNITIVE DYNAMIC COMPUTING SYSTEM OPTIMIZATION

(71) Applicant: International Business Machines Corporation, Armonk, NY (US)

(72) Inventors: Dongkook Park, Austin, TX (US); Matthew A. Cooke, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 16/733,603

(22) Filed: Jan. 3, 2020

(65) Prior Publication Data

US 2021/0208932 A1 Jul. 8, 2021

(51) Int. Cl.
G06F 9/46 (2006.01)
G06F 9/50 (2006.01)
G06F 9/445 (2018.01)
G06F 11/34 (2006.01)
G06N 20/00 (2019.01)

(52) U.S. Cl.
CPC .......... *G06F 9/505* (2013.01); *G06F 9/44505* (2013.01); *G06F 11/3495* (2013.01); *G06N 20/00* (2019.01)

(58) Field of Classification Search
CPC .. G06F 9/505; G06F 9/44505; G06F 11/3495; G06N 20/00
See application file for complete search history.

(56) References Cited

U.S. PATENT DOCUMENTS

| | | | |
|---|---|---|---|
| 6,665,791 B1 | 12/2003 | Berenbaum et al. | |
| 7,051,188 B1 | 5/2006 | Kubala et al. | |
| 9,424,282 B2 | 8/2016 | Plattner et al. | |
| 10,140,021 B2 | 11/2018 | Curtis-Maury et al. | |
| 10,176,022 B2 | 1/2019 | Altman et al. | |
| 10,908,940 B1* | 2/2021 | Farhan | H04L 67/1031 |
| 2009/0164812 A1 | 6/2009 | Capps, Jr. et al. | |
| 2017/0090955 A1* | 3/2017 | Hsiao | G06F 11/3476 |
| 2018/0314617 A1* | 11/2018 | Khosrowpour | G06F 11/3409 |

FOREIGN PATENT DOCUMENTS

EP   1089173 A2   4/2001

OTHER PUBLICATIONS

Bennani et al, Assessing the Robustness of Self-Managing Computer Systems under Highly Variable Workloads, IEEE, 2004, 9 pages.*
Wang et al, Understanding and Auto-Adjusting Performance-Sensitive Configurations, ACM, 2018, pp. 154-168.*
(Continued)

*Primary Examiner* — Diem K Cao
(74) *Attorney, Agent, or Firm* — Patterson + Sheridan, LLP

(57) ABSTRACT

A technique for dynamically adjusting a configuration of a computing system includes determining, during execution of a workload on the computing system, one or more characteristics of the workload. A system configuration from a plurality of system configurations available for the computing system is selected based on the one or more characteristics of the workload. A current configuration of the computing system is adjusted according to the selected system configuration, during the execution of the workload.

20 Claims, 13 Drawing Sheets

(56) References Cited

OTHER PUBLICATIONS

Wu et al, "Development of an Adaptive Workload Managment System USing the Queuing Network-Model Human Processor" The 51st Annual Conference of the Human Factors and Ergonomics Society, Baltimore, MD, USA (Accepted) 2008, 4 pages.

Kandemir, Cansu. "Improvement of Work Process Performance with Task Assignments and Mental Workload Balancing" (2016). Doctor of Philosophy (PhD), dissertation, Engineering Managment, Old Dominion University, DOI: 10.25777/ae3x-ns69. https://digitalcommons.odu.edu/emse_etds/10 , 162 pages.

Authors et. al.: Disclosed Anonymously, "Dynamic identification and pinning of workloads to certain physical servers to minimize placement entropy," IP.com Electronic Publication Date: Feb. 26, 2014, 9 pages.

Authors et. al.: Disclosed Anonymously, "System and methods to efficiently manage workload patterns in the Cloud" IP.com Electronic Publication Date: Jan. 31, 2013, 7 pages.

Authors et. al.: Disclosed Anonymously, "Automatic resource allocation based on an adaptive application profile environment to optimize computing resources" IP.com Electronic Publication Date: Jul. 15, 2011, 4 pages.

\* cited by examiner

|  | 702A | 702B | 702C | 702D |  |
|---|---|---|---|---|---|
| Category | $P_1$ | $P_2$ | $P_3$ | $P_4$ | ... |
| $C_1$ | 1 | On | 32 | RR | ... |
| $C_2$ | 1 | Off | 32 | RR | ... |
| $C_3$ | 0 | On | 32 | LRU | ... |
| $C_4$ | 0 | On | 64 | LRU | ... |
| $C_5$ | 2 | Off | 64 | RANDOM | ... |
| ⋮ |  | ⋮ |  | ⋮ |  |

WORKLOAD-BASED COGNITIVE DYNAMIC COMPUTING SYSTEM OPTIMIZATION

BACKGROUND

The present invention generally relates to managing computing systems, and more specifically, to dynamically adjusting a configuration of a computing system based on workloads being run on the computing system.

Modern microprocessors typically execute a wide variety of workloads that have various characteristics (e.g., type of instructions, amount of source dependencies, virtual storage usage, etc.). The wide variety of workloads generally have different impacts on the operation of the microprocessor. For example, the diversity in workloads can lead to different resource utilization in the microprocessor. Consequently, one of the goals during the microprocessor design phase is to find a set of configuration parameters that can achieve optimal processor performance across a wide variety of workloads. However, in general, it can be significantly time consuming and difficult to find a single set of configuration parameters that provides optimal performance for a diverse set of workloads. Additionally, even if a single optimal set of configuration parameters is obtained, new workloads may be introduced, and they may not work optimally with the existing microprocessor's configuration.

SUMMARY

One embodiment presented herein describes a method performed by a computing system. The method generally includes determining, during execution of a first workload on the computing system, one or more characteristics of the first workload. The method also includes selecting a first system configuration from a first plurality of system configurations available for the computing system, based on the one or more characteristics of the first workload. Selecting the first system configuration includes computing a set of metrics for the one or more characteristics of the first workload, determining, based on the set of metrics, that the first system configuration satisfies one or more conditions, and selecting the first system configuration. The method further includes adjusting a current configuration of the computing system according to the selected first system configuration, during the execution of the first workload.

Other embodiments include, without limitation, a computer program product that includes a storage medium having computer-readable program code that enables a processing unit to implement one or more aspects of the disclosed methods as well as a computing system having a processor, memory, and application programs configured to implement one or more of the disclosed methods.

BRIEF DESCRIPTION OF THE SEVERAL VIEWS OF THE DRAWINGS

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
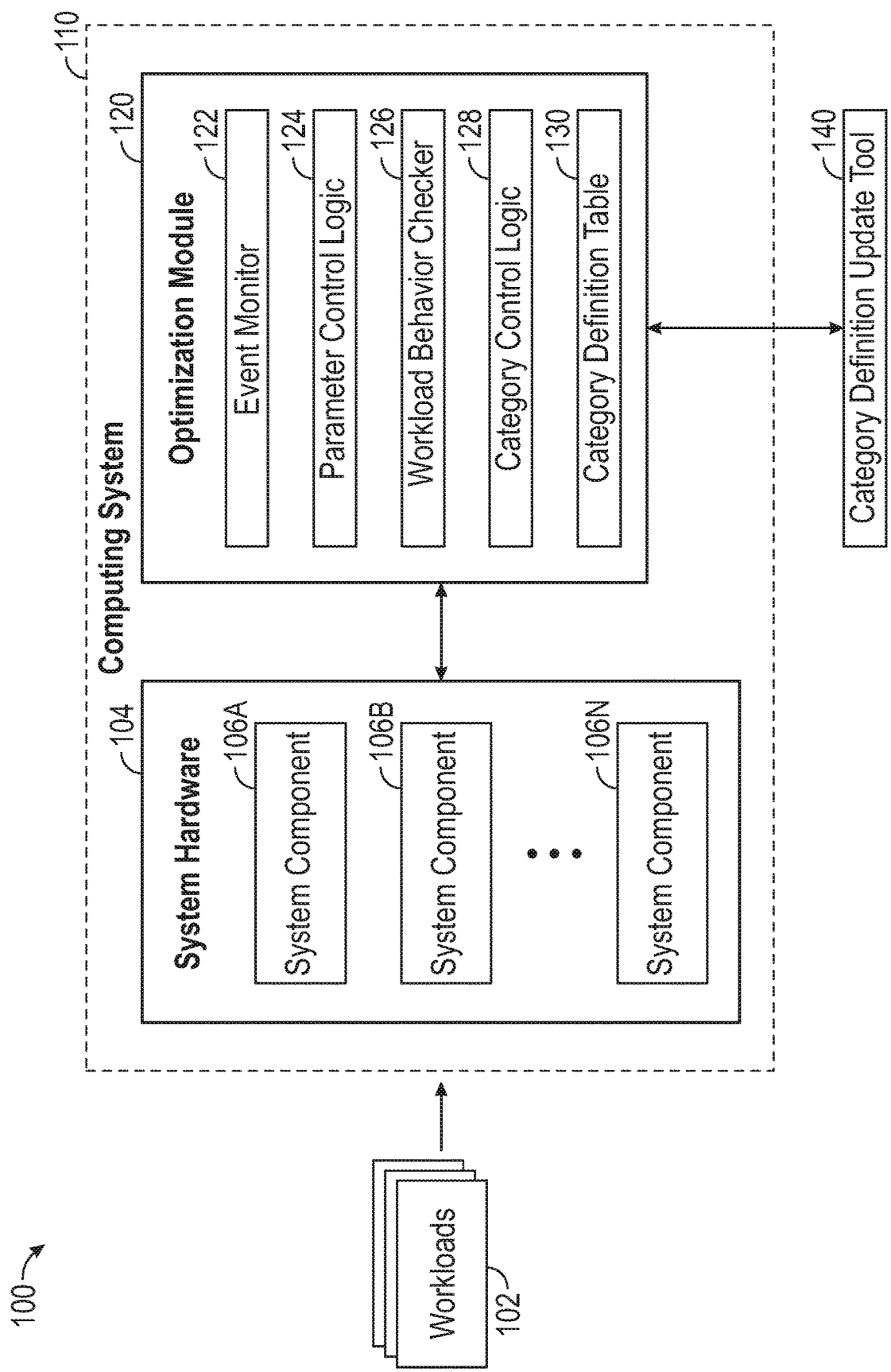
FIG. 1 illustrates an example system architecture for performing workload-based dynamic optimization of a computing system, according to one embodiment.

Embodiments described herein provide methods, processing systems, and computer-readable mediums for dynamically adjusting a configuration of a computing system based on workloads being run on the computing system. Server workloads, for example, can include multiple applications that have different characteristics. In one reference example, the ratio between vector and scalar instructions or the ratio between floating point and integer instructions can vary for each workload. In another reference example, some workloads may have a large number of instruction dependencies (e.g., above a threshold number of dependencies), compared to other workloads. In yet another reference example, some workloads may have long chained source dependencies. Such diversity in workload characteristics can lead to different resource utilization in the computing system (e.g., a size of one or more queues, such as instruction buffer, instruction dispatch queue, issue queue, etc., in a processor of the computing system).

Due in part to the different impacts a given workload can have on operation of a computing system, conventional techniques typically attempt to find a system configuration that provides optimal performance across a wide variety of workloads. Such techniques, for example, generally perform several sensitivity analyses via simulation during the design phase (e.g., during the architecture definition and performance optimization phases of a processor) to determine the optimal sizes of resources (e.g., one or more queue sizes, such as size of instruction sequencing queue (ISQ), size of load reorder queue (LRQ), size of store reorder queue (SRQ), etc.) in the processor as well as the optimal arbitration schemes (e.g., Least-Recently-Used (LRU), Round Robin (RR), etc.) to handle contention in the processor. As noted however, in many cases, it may not be feasible (or even possible) during the system design phase to find a single system configuration (e.g., a single set of processor configuration parameters) that provides optimal performance across a diverse set of workloads. For example, while some workloads may benefit from increased resources (e.g., a larger SRQ size), other workloads may suffer from other issues caused by the increased resources (e.g., increased backpressure (or resistance) to instruction dispatch/issue logic caused by more instructions sitting in the SRQ waiting to be drained).

Consequently, selecting a single system configuration in the system design phase may inevitably lead to a compromise in system operation for some workloads. Moreover, even in cases where a single system configuration (determined using conventional techniques) provides some level of satisfactory performance across a wide range of diverse workloads, the system configuration may not provide optimal performance for future workloads (e.g., workloads introduced subsequent to the processor design). Further, apart from the design phase, performing a post-silicon configuration tuning/optimization process with current techniques is generally an inefficient and time-consuming process involving a significant amount of effort. That is, in many cases, hardware that has been designed using the conventional techniques described above may not be able to be optimized to account for additional workloads (not encountered during the design phase).

To address these issues, embodiments provide techniques for dynamically adjusting a configuration of a computing system based on workloads being run on the computing system. In particular, embodiments can determine multiple system (e.g., processor) configurations (e.g., via a workload analysis) and classify different types of workloads into the multiple system configurations. During the execution of a particular workload, embodiments can dynamically switch a system's configuration (e.g., in real-time) during execution of the workload, based on the particular system configuration (of the multiple system configurations) that provides the optimal performance (e.g., satisfies one or more conditions) for that type of workload. Doing so allows the computing system to dynamically adapt to various workload characteristics, providing optimal performance and power behavior for the workload(s). Additionally, by dynamically adapting a computing system's configuration to optimally handle various workload characteristics, embodiments can provide users with greater flexibility and significantly reduce the amount of time/effort spent during the microprocessor design and performance optimization processes/phases, as well as post-silicon configuration tuning. Further yet, embodiments can include such classification information a part of the updatable firmware to account for new workloads introduced after the computing system has been deployed to a user. Doing so can help users optimize for (future) workloads that may not have been accounted for during the system design phase.

Note, to clearly point out novel features of the present invention, the following discussion omits or only briefly describes conventional features of information processing systems which are apparent to those skilled in the art. It is assumed that those skilled in the art are familiar with the general architecture of processors, and in particular with processors which operate in an in-order dispatch, out-of-order execution, in-order completion fashion. Further, note that while the techniques described herein can be used to improve optimization time during the design phase, the techniques described herein are not limited to this aspect. For example, the techniques described herein can also be used to improve (e.g., significantly reduce) optimization time during a post-silicon configuration parameter optimization process.

FIG. 1 illustrates an example system architecture 100 for performing workload-based dynamic optimization of a computing system 110, according to one embodiment. The system architecture 100 includes multiple workloads 102, a computing system 110, and a category definition update tool (CDUT) 140. The computing system 110 includes system hardware 104, which includes multiple system components 106A through 106N. The system components 106 A-N can include, but are not limited to, processor(s), memory, network devices, storage, communication components, I/O devices, etc. Each of the system components 106 may be interconnected and may communicate using one or more system buses (not shown). The system components 106 may be coupled to other system components 106 via a system bus (not shown).

In one reference example, the system hardware 104 (e.g., network component 106A) can include a central processing unit (CPU) (or "processor"). The CPU may include various registers, buffers, memories, and other units formed by integrated circuitry, and may operate according to reduced instruction set computing ("RISC") techniques. The CPU may be configured to operate in single threaded (ST) mode or simultaneous multi-threaded (SMT) mode. In another reference example, the system hardware 104 can include memory (e.g., network component 106B). The memory may include a variety of computer readable media, including, for example, volatile and/or non-volatile media, removable and/or non-removable media, etc. The memory may include one or more caches, random access memory, read only memory, etc. In some examples, the memory may include one or more memory controllers to control access to different levels of memory. In yet another reference example, the system hardware 104 can include storage (e.g., network component 106C), one or more I/O interfaces (e.g., network component 106D), etc.

In one embodiment, the computing system 110 may receive one or more workloads 102 and may use one or more of the system components 106 A-N in system hardware 104 to execute the workloads 102. As noted, in conventional techniques, the system components 106 A-N may use a predefined fixed set of configuration parameters or settings to execute the workloads 102. For example, such configuration parameters may have been defined during the initial architectural definition and workload optimization phases. In some cases, the predefined configuration parameters may not be able to be changed while the computing system 110 is operational (e.g., the configuration parameters may remain the same while the computing system 110 is online).

According to one embodiment described herein, the computing system 110 also includes an optimization module 120, which can dynamically adjust the configuration of the computing system (e.g., system hardware 104) based on the workloads 102 being currently run on the computing system 110. As shown, the optimization module 120 includes an event monitor (EM) 122, a parameter control logic (PCL) 124, a workload behavior checker (WBC) 126, a category control logic (CCL) 128, and a category definition table (CDT) 130, each of which is described in more detail below.

In one embodiment, multiple different system configurations (also referred to herein "configuration parameter categories") may be defined and classified (referred to herein as "classification information") during a workload analysis and performance optimization. For example, the system configurations may be defined during a design phase of the computing system 110, and the final classification may be stored as part of the system firmware. Each system configuration may include a different set of configuration parameters and/or different values for a set of configuration parameters. As noted, the configuration parameters in a given system configuration may be associated with one or more system components 106 of the system hardware 104.

In one embodiment described herein, the optimization module 120 may use classification information during operation of the computing system 110. For example, the optimization module 120 may monitor workload behavior to determine the optimal system configuration (or configuration parameter category) for the workload, and switch the system configuration accordingly. By providing multiple choices in the configurations of the computing system, the entire computing system can be tuned to provide the optimal performance for specific workloads of interest to end-users. As such, embodiments overcome the design simplicity of fixed computing system configurations, which may compromise workload performance in order to achieve an "optimal" performance across a diverse set of workloads. In a multi-core CPU, some embodiments may contain unique optimization module 120 components (such as EM and PCL) per core, and some functionality within may even be per-thread.

Additionally, or alternatively, embodiments allow for the classification information to be updated post deployment of the computing system 110. As shown in FIG. 1, for example, the system architecture 100 includes a category definition update tool (CDUT) 140, which can be used to update the classification information used by the optimization module 120. This CDUT 140 is described in more detail below. By allowing for the post-deployment update of classification information, embodiments can provide a performance optimization capability for future workloads that are not known or accounted for during the design phase.

Figure 2:
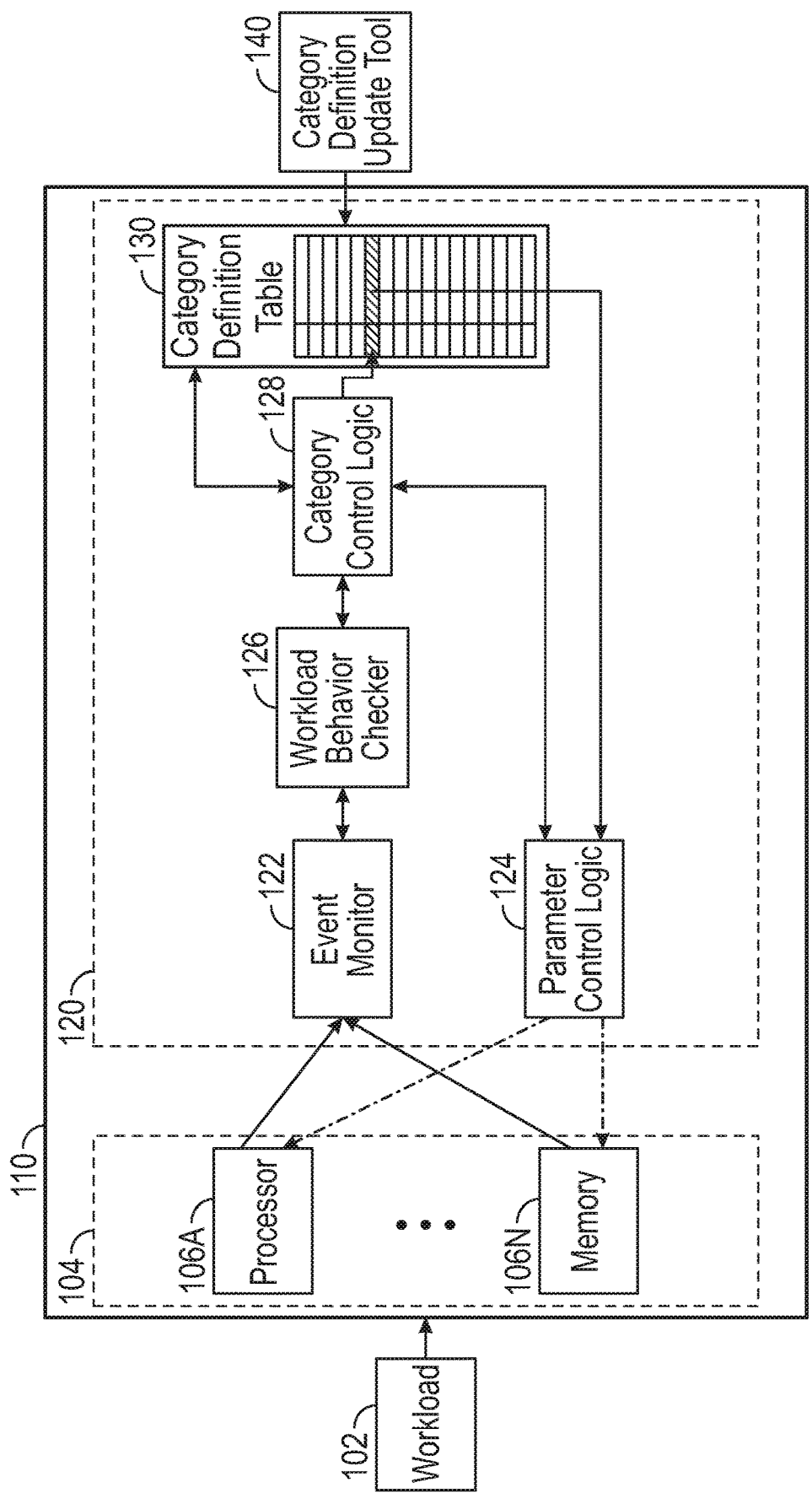
FIG. 2 further illustrates components of the system architecture depicted in FIG. 1, according to one embodiment.

FIG. 2 is a block diagram further illustrating components of the system architecture 100, according to one embodiment. In this particular embodiment, the system hardware 104 includes a processor 106A and memory 106N. Note, however, that this is merely a reference example and that the system hardware 104 can include other system components 106 (e.g., storage, network devices, etc.). In one embodiment, the computing system 110 may receive a workload 102 and may begin running (or executing) the workload 102 using the system hardware 104.

The EM 122 monitors the performance of the system components 106 (e.g., processor 106A, memory 106N, etc.) while the workload 102 is being run. For example, the EM 122 can detect events that occur on each of the system components 106, extract information from the system components 106 in response to detecting the events, and transmit the information (e.g., event data) to the WBC 126. Examples of the extracted information can include, but is not limited to, number of Level 2 (L2)/Level 3 (L3) cache hits/misses, number of scalar instructions, number of vector instructions, number of instructions retired, elapsed core clock ticks, core frequency, etc. In one embodiment, the EM 122 can convert the information extracted from each system component from a first format into a second format that the WBC 126 is able to understand and process.

The WBC 126 receives the event data from the EM 122 and generates a set of metrics for each of the system components 106. Using the processor 106A and memory 106N depicted in FIG. 2 as a reference example of system components 106, the WBC 126 can generate a first set of metrics for processor 106A and a second set of metrics for memory 106N. One example of a metric that can be generated for processor 106A can include the ratio of vector/scalar instructions in the processor 106A. Another example of a metric that can be generated for memory 106N can include cache utilization. In general, however, the WBC 126 can generate any type of metric with the information received from EM 122. In one embodiment, the metrics that are generated may be pre-defined for the WBC 126 (e.g., during the design phase of the computing system 110).

The WBC 126 forwards (or transmits) the generated metrics to the CCL 128, which determines (based on the metrics) the optimal category of configuration parameters for the workload 102 being run on the computing system 110. As will be described in more detail below with regard to FIG. 5, the CCL 128 can perform various techniques to determine the optimal category of configuration parameters for the workload 102 (e.g., determine which category of configuration parameters satisfies one or more conditions).

In one embodiment, the CCL 128 can use a fixed combinational logic based method to determine the optimal category of configuration parameters (e.g., which category satisfies one or more conditions). The combinational logic based method, for example, may use a predefined set of rules (or mappings) for the classification. In another embodiment, the CCL 128 can use a configurable logic based classification to determine the optimal category of configuration parameters. The configurable logic based classification may employ a memory structure (such as a ternary content addressable memory (TCAM)) to specify masked combinations of inputs into specific categories of configuration parameters. Using this memory structure allows for a configurable logic based classification, since new categories can be added in category definition updates. In yet another embodiment, the CCL 128 can use a machine learning (ML)-based classification to determine the optimal category of configuration parameters. The ML-based classification, for example, can employ a neural network with the set of metrics as input and a particular category of configuration parameters as an output.

Once a particular category is determined, the CCL 128 provides a category number of the CDT 130 corresponding to the particular category to the PCL 124. The category number, for example, is the index of the CDT 130, where the set of configuration parameters for the category are stored. The CDT 130 includes the indexes and values of the configuration parameters. The values of the configuration parameters may be predetermined during the design phase, e.g., based on workload analysis, architectural exploration, and performance optimization performed during the design phase.

The PCL 124 provides an interface between the CCL 128/CDT 130 and the system components 106. The PCL 124 can update configuration settings in the hardware. For example, the PCL 124 can retrieve the set of configuration parameters from the CDT 130 (e.g., using the category number), and configure/update the current configuration parameters of the system components 106A and 106N with the set of configuration parameters retrieved from the CDT 130. In some embodiments, the PCL 124 can convert the configuration parameters from the CDT 130 into actual logic signals in the system components 106A and 106N, so that the computing system 110 can switch operation modes accordingly. In some embodiments, the PCL 124 can also trigger clock/power-gating of unnecessary resources based on the configuration, e.g., to reduce power consumption.

As noted, embodiments also allow for post-deployment update of the categories of configuration parameters. In one embodiment, for example, the CDUT 140 can update the categories using a flash device (e.g., parallel NOR (PNOR)), e.g., in a firmware update. When the computing system 110 boots up, the computing system 110 may initialize the CDT 130 from the flash device, thereby receiving the updated categories of configuration parameters. As noted, this approach enables post-deployment update of the CDT 130, which in turn increases the flexibility of the computing system 110 to account for future workloads. Note that FIG. 2 depicts merely a reference example of the components of the system architecture 100 and that other configurations of the system architecture 110 can be used to implement the techniques described herein. For example, in other embodiments, one or more of the components of the system architecture 100 may be combined (e.g., the EM 122 and the WBC 126 may be combined into a single component).

Figure 3:
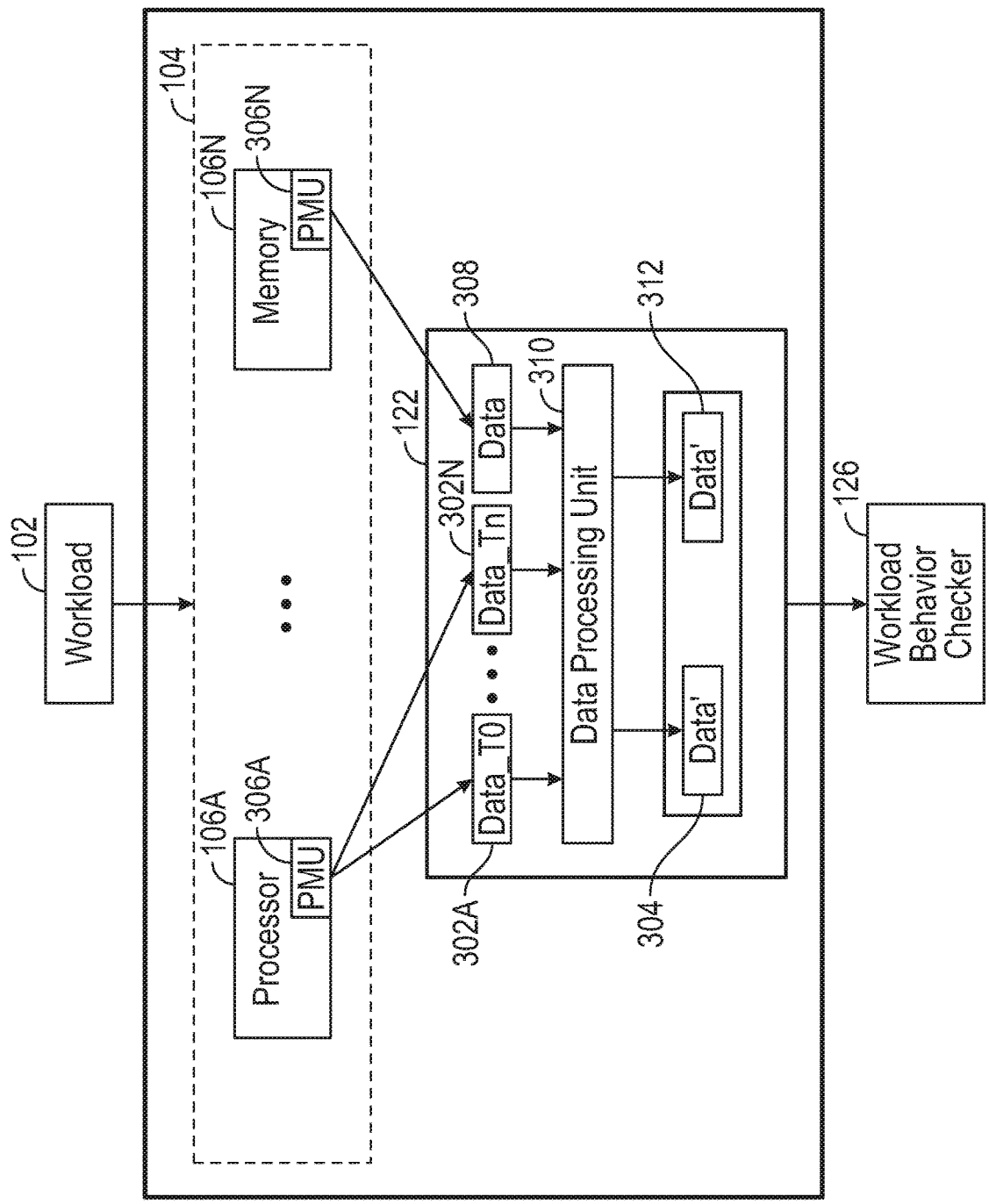
FIG. 3 illustrates components of an event monitor within a computing system, according to one embodiment.

FIG. 3 further illustrates components of the EM 122 described relative to FIG. 2, according to one embodiment. As shown, each system component 106 (e.g., processor 106A and memory 106N) can include a respective performance monitoring unit (PMU) 306, which monitors performance and events that occur on that system component 106. For example, the PMU 306A can monitor performance, such as the number of instructions retired, elapsed core clock ticks, core frequency, etc. In one example, the PMU 306N can monitor the number of L2/L3 cache hits/misses and other events associated with memory 106N.

The EM 122 includes a data processing unit 310, which extracts the information from each PMU 306 in a first format and converts the information to a second format that can be processed by the WBC 126. As shown in FIG. 3, for example, the data processing unit 310 can extract data 302 A-N from multiple threads $T_0$ to $T_N$, respectively, of the processor 106A and extract data 308 from the memory 106N. The data processing unit 310 may convert data 302 A-N to data' 304 and convert data 308 to data' 312. The data processing unit 310 then sends the data' 304 and data' 312 to the WBC 126. Note, in some cases, the data conversion may involve pre-processing of the data before it is sent to the WBC 126. In addition, in some cases, the data processing unit 310 may have to collect the data 302 and data 308 over multiple cycles.

Figure 4:
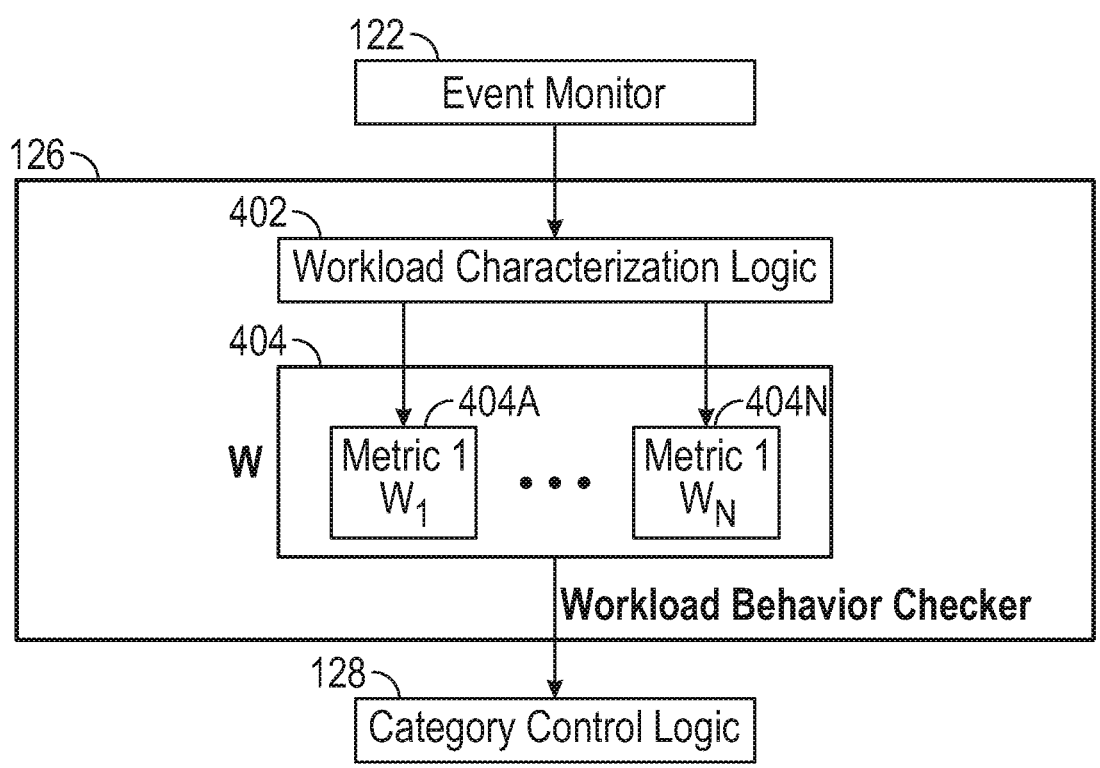
FIG. 4 illustrates components of a workload behavior checker within a computing system, according to one embodiment.

FIG. 4 further illustrates components of the WBC 126, described relative to FIG. 2, according to one embodiment. As noted, the WBC 126 derives a set of metrics 404 that describe the characteristics of the workload 102 received by the computing system 110. The set of metrics (W) 404 can be predetermined during the design phase, based on classification information (described in more detail below with respect to FIG. 6). Once the set of metrics (W) 404 are computed, the values of the metric are forwarded to the CCL 128.

In this particular embodiment, the WBC 126 includes workload characterization logic 402, which evaluates the data received from the EM 122. For example, during the design phase, one or more workload features (or metrics) may be defined to characterize multiple workloads. To derive the characteristics of the workload being executed, the workload characterization logic 402 may use the data from EM 122 and generate metrics 404 A-N (predefined during the design phase) for system components 106 A-N, respectively. These metrics 404 may be evaluated by the CCL 128, using one or more techniques, to determine which category of configuration parameters satisfies one or more conditions associated with performance of the computing system. For example, the one or more conditions may include at least one of a threshold amount of resources in the computing system, a threshold amount of power consumption by the computing system, a threshold number of instructions retired in a processor in the computing system, and a threshold number of cache hits by the processor in the computing system.

One example metric for a processor (e.g., $W_1$ 404A) can be based on "instruction mix." Certain workloads, for example, may include a mixture of different types of instructions (e.g., floating point instructions, scalar instructions, vector instructions, etc.). In some cases, the performance of the processor can be impacted by the mixture of instructions (e.g., depending on the amount (or ratio) of the different types of instructions). In one particular example, when instructions include a mixture of scalar and vector instructions, some of the scalar instructions can experience starvation during instruction issue time, which in turn, can block instructions dependent on the scalar instructions. This can cause a significant performance drop in the processor. Accordingly, in this example, the "instruction mix" metric can include the ratio of scalar to vector instructions.

Another example metric for a memory (e.g., $W_N$ $404_N$) can be based on "cache access behavior." Generally, if a workload is characterized by a low level of cache utilization (e.g., below a threshold), the processor can be reconfigured to power down part of the cache to save power without sacrificing performance. Thus, one example metric based on "cache access behavior" may include the cache utilization. In other scenarios, if a workload experiences a high level of cache misses (e.g., above a threshold), the cache miss rate can be reduced by at least one of: increasing the cache size, changing set associativity (e.g., to reduce aliasing), etc. Thus, another example metric based on "cache access behavior" may include the cache miss rate (or in some cases, the cache hit rate). In general, the workload characterization logic 402 can provide metrics values for each of the system components 106, based on data received from EM 122, so that the CCL 128 can determine which combination of configuration parameters are best suited for the system components 106.

As noted, the CCL 128 may classify the workload characteristics (e.g., metrics 404) into one of multiple categories of configuration parameters. The categories of configuration parameters may be predetermined/preconfigured during the design phase, e.g., based on analysis and performance optimization of multiple workloads. For example, during a typical processor design phase, various different workloads are tested and their performance is estimated via simulations. To optimize a given workload's performance, a sensitivity analysis is performed over different parameter values. For example, a size of a physical resource (e.g., size of internal queues, such as ISQ, LRQ, SRQ, etc.) can be changed, different arbitration schemes can be applied (e.g., round-robin vs. age-based instruction scheduling, etc.), design features can be selectively enabled/disable (e.g., pipeline bypassing, branch prediction schemes, etc.), etc. Instead of attempting to identify a single set of configuration parameters that provides optimal performance across all of the workloads being tested, embodiments allow for several categories of configuration parameters, each of which may provide optimal performance for a certain set of workloads, to be created and defined during the design phase.

Figure 5:
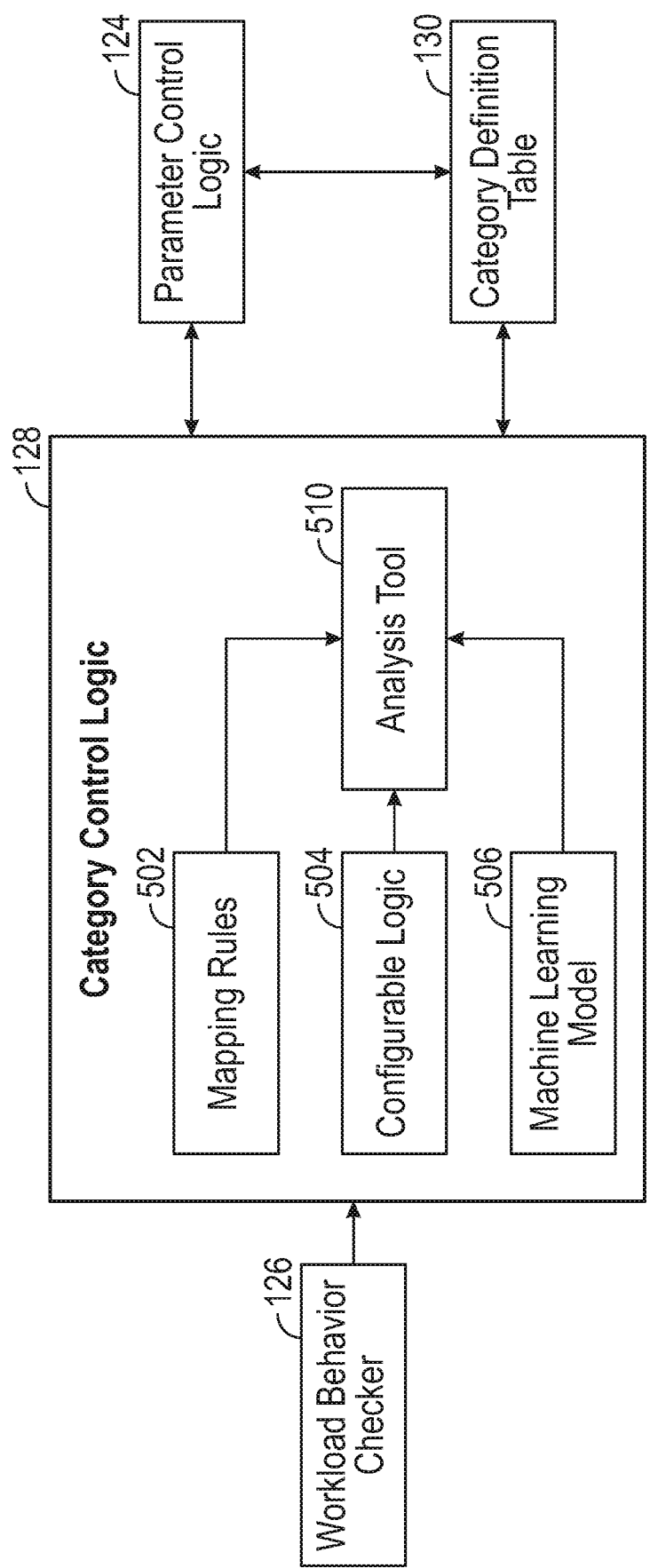
FIG. 5 illustrates components of a category control logic within a computing system, according to one embodiment.

FIG. 5 further illustrates components of the CCL 128, described relative to FIG. 2, according to one embodiment. The CCL 128 determines which of the categories of configuration parameters to use for the workload 102 being run on the computing system 110, based on the metric values received from the WBC 126. In particular, the CCL 128 can determine a category number, which is an index to the particular category of configuration parameters in the CDT 130. Once the CCL determines the category number, it can look up the CDT 130, and instruct PCL 124 to retrieve the corresponding configuration parameters from the CDT 130.

The CCL 128 includes an analysis tool 510, mapping rules 502, configurable logic 504, and a machine learning (ML) model 506. The analysis tool 510 can use the mapping rules 502, the configurable logic 504, or the ML model 506 to determine, based on the set of metrics for a given workload 102, which of the categories of configuration parameters satisfies one or more conditions associated with performance of the computing system 110. In one embodiment, the analysis tool 510 can implement a logic-based classification, e.g., using mapping rules 502 or configurable logic 504. In another embodiment, the analysis tool 510 can implement a ML-based classification, e.g., using ML model 506.

In general, given a workload i, the analysis tool 510 can take $W_i$ as input and determine the category $C_i$, so that the computing system 110 can configure itself based on $P_1$ values specified $C_i$, in where P is a set of configurable parameters (e.g., queue size, arbitration schemes, feature control, etc.), W is the set of metrics for workload characteristics/features (e.g., instruction mix, source dependency, cache access behavior, etc.), and C is the set of configuration parameter categories, each of which is mapped to specific combination of P values.

Typically, when size (P) is small, the design exploration space may not be large and it is likely that size (C) may also be small. However, as size (P) gets larger, there may be more combinations of configurable parameters, potentially increasing size (C) as well. Additionally, if size (W) is small, classification accuracy can drop significantly since the overall workload behavior depends on the combination of W. However, in this case, the classification logic may not have to be complex (e.g., classification can be performed using mapping rules 502 or configurable logic 504). On the other hand, when size (W) is large, this may allow for a more accurate classification by considering more workload characteristics at the cost of a more complex classification logic (e.g., classification can be performed using machine learning model 506). As used herein, "size (X)" refers to the number of elements in the object X, where X is one of P, W, and C.

Figure 6A:
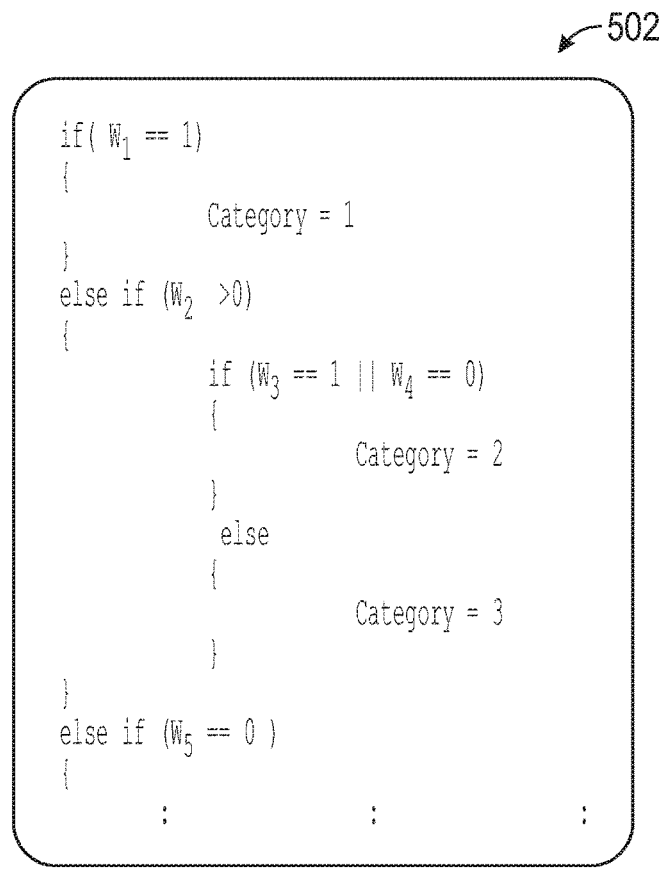
FIG. 6A illustrates an example of mapping rules that can be used by the category control logic depicted in FIG. 5, according to one embodiment.

In scenarios where the size (W) is small (e.g., below a threshold number), the analysis tool 510 can use the mapping rules 502 to perform the classification of the workload characteristics (in the form of metrics 404) received from the WBC 126 to one of the categories of configuration parameters in CDT 130. FIG. 6A depicts one reference example of mapping rules 502 between W and C. The mapping rules 502 may work well for workloads evaluated during the design/optimization phase, but may not be flexible to handle new workloads since the logic is fixed. In addition, mapping rules 502 may not work well for scenarios where the relationship between W and C is not clear.

In some embodiments, the analysis tool 510 may implement a configurable logic based classification, e.g., using configurable logic 504. This can provide additional flexibility to add new categories, compared to the fixed mapping rules 502. In general, to accommodate category definition updates that add new categories, the CCL 128 should have some ability to reference the new categories. One approach to this issue is to make the CCL logic configurable, e.g., with configurable logic 504. The configurable logic 504 may be constrained by the size of W and C. Since the size of the configuration array grows on the order of O(n) for C and $O(2^n)$ for W, a traditional lookup table may not be possible for the configurable logic 504 (in cases where size(W) is large, e.g., above a threshold).

Figure 6B:
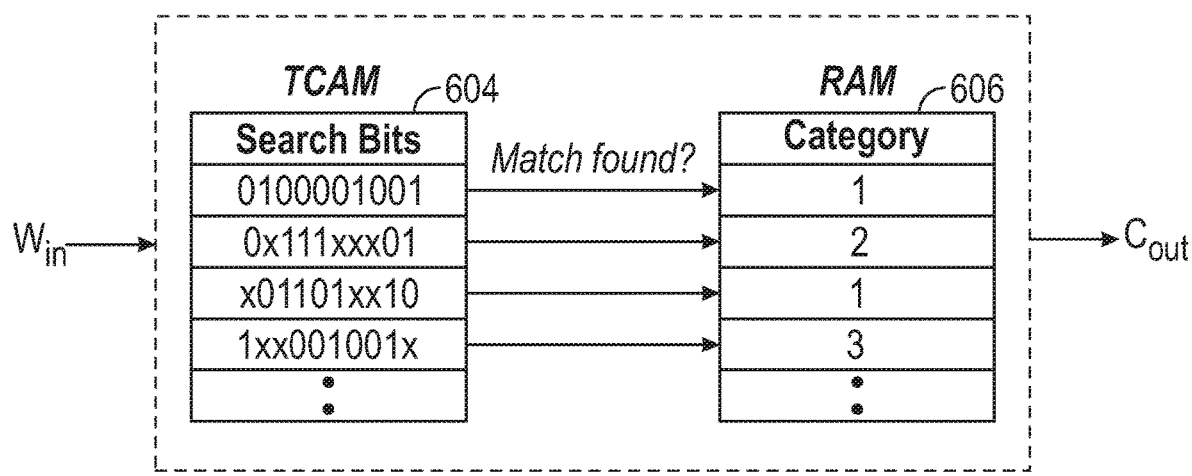
FIG. 6B illustrates an example of a configurable category control logic within a computing system, according to one embodiment.

FIG. 6B depicts an example of a configurable CCL 602, which employs a TCAM 604 as configurable logic 504, according to one embodiment. Instead of mapping every possible input combination for W to a C output (e.g., as is the case for mapping rules 502), the configurable CCL 602 uses a limited memory structure to specify masked combinations of inputs that result in specific categories. For example, assuming that size (W) is 10 and each W entry is a single bit, this results in a 10-bit $W_{in}$. In this example, the configurable CCL 602 can use a TCAM 604, where each entry in the TCAM 604 includes 10-bit search words (consisting of 1, 0, and x (don't care) bits). The "x" bits can be created using a mask bit with each memory bit. As shown in FIG. 6B, if a matching entry for an input $W_{in}$ is found, the corresponding entry from the RAM 606 will become the category number $C_{out}$ for this workload. Since masks with partial bits (e.g., using "don't care" bits) can be created, the configurable CCL 602 allows for mapping multiple inputs to the same category (e.g., as shown in FIG. 6B, multiple entries in RAM 606 can have the same category number). Unlike the mapping rules 502, the contents of the TCAM 604 can be updated during boot time (e.g., via a firmware update), making it configurable to support post-deployment category definition changes.

Figure 6C:
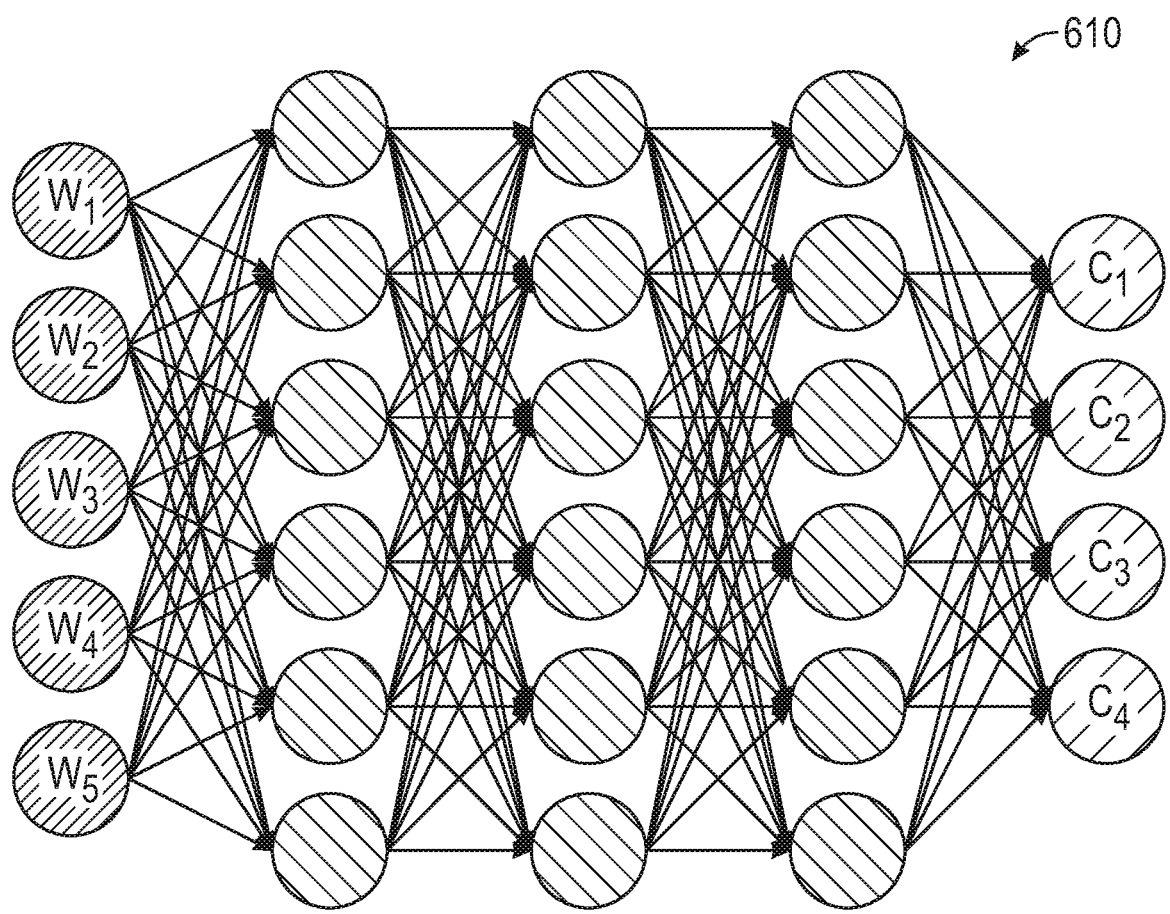
FIG. 6C illustrates an example neural network that can be used by the category control logic depicted in FIG. 5, according to one embodiment.

Referring back to FIG. 5, in scenarios where the size (W) is large (e.g., above a threshold number) and/or size (C) is large (e.g., above a threshold number), the analysis tool 510 can use the ML model 506 to perform the classification of the workload characteristics (in the form of metrics 404) received from the WBC 126 to one of the categories of configuration parameters in the CDT 130. FIG. 6C depicts one reference example of a neural network (NN) 610 that can be used as the ML model 506. Here, the NN 610 is a 5-layer NN, with $W \in \{W_1, W_2, W_3, W_4, W_5\}$ as input and $C \in \{C_1, C_2, C_3, C_4\}$ as output. Note, however, that NN 610 is used as merely a reference example, and that other NN configurations and ML techniques can be used. In one embodiment, a training set for NN 610 can be created using performance data from sensitivity analysis during the design phase. The NN 610 can be trained using the training set to create a NN that can classify workloads based on their characteristics. In some embodiments, the NN 610 may be implemented with a dedicated hardware/software accelerator. The NN 610 may allow for a post-deployment update of category definitions, since the NN 610 can be retrained with new training data that includes newer workloads.

Figures 7, 8:
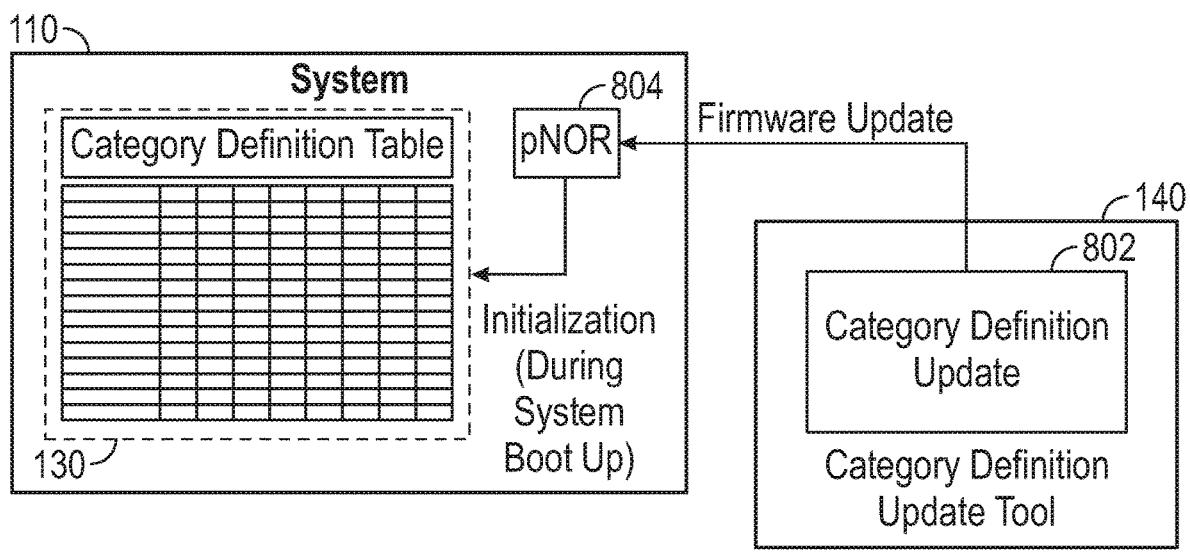
FIG. 7 illustrates an example category definition table, according to one embodiment.
FIG. 8 illustrates an example post-deployment update of a category definition table, according to one embodiment.

FIG. 7 depicts a reference example of a CDT 130, described relative to FIG. 2, according to one embodiment. As noted, the CDT 130 is a table indexed by category number (e.g., $C_1, C_2, C_3, C_4, C_5$, and so on). Each row entry of the CDT 130 includes multiple parameter fields 702, each of which corresponds to one of the parameters P. In this particular example, the CDT 130 includes parameters $P_1$ 702A, $P_2$ 702B, $P_3$ 702C, $P_4$ 702D, and so on. $P_1$ 702A can be indicative of a branch prediction scheme (e.g., scheme 1 for "1", scheme 2 for "0", and scheme 3 for "2"). $P_2$ 702B can be indicative of whether bypassing is enabled ("ON") or disabled ("OFF"). $P_3$ 702C can be indicative of a packet size (e.g., 32 bytes or 64 bytes). $P_4$ 702D can be indicative of a particular arbitration scheme (e.g., RR, LRU, Random, etc.). Note, however, that the parameters depicted in FIG. 7 are merely reference examples, and that the CDT 130 can include any number and/or type of parameters.

Depending on the range of a given parameter P, the corresponding field 702 can have one or multiple bits. Thus, the overall size of the CDT 130 may depend on the sum of bit width of all the parameters in P. As noted, the parameters in P and the range of values for each parameter can be chosen during the design phase. An offline classification can be done to determine the categories C and their corresponding parameter values. In some embodiments, even if the classification method is based on mapping rules 502, the offline classification can be performed using ML-based techniques. The offline classification results can be stored in a firmware for initialization and/or update of the CDT 130. For example, in one embodiment, the CDT 130 can initialize itself with the data from the firmware (e.g., a pNOR) during system boot-up time.

FIG. 8 depicts an example of the CDUT 140 performing a post-deployment update of the CDT 130, according to one embodiment. As shown, the CDUT 140 include a category definition update 802. To generate the category update 802, a user (e.g., vendor) may perform performance optimization with a newer set of workloads (e.g., workload(s) not available during the initial design phase), redefine categories and corresponding parameter values, and provide the updated CDT data to the CDUT 140. The CDUT 140 can deploy the category definition update 802 to firmware (e.g., pNOR 804) within the computing system 110 as part of a firmware update. During system boot-up time, the CDT 130 may then be automatically initialized and/or updated with the category definition update 802.

Figure 9:
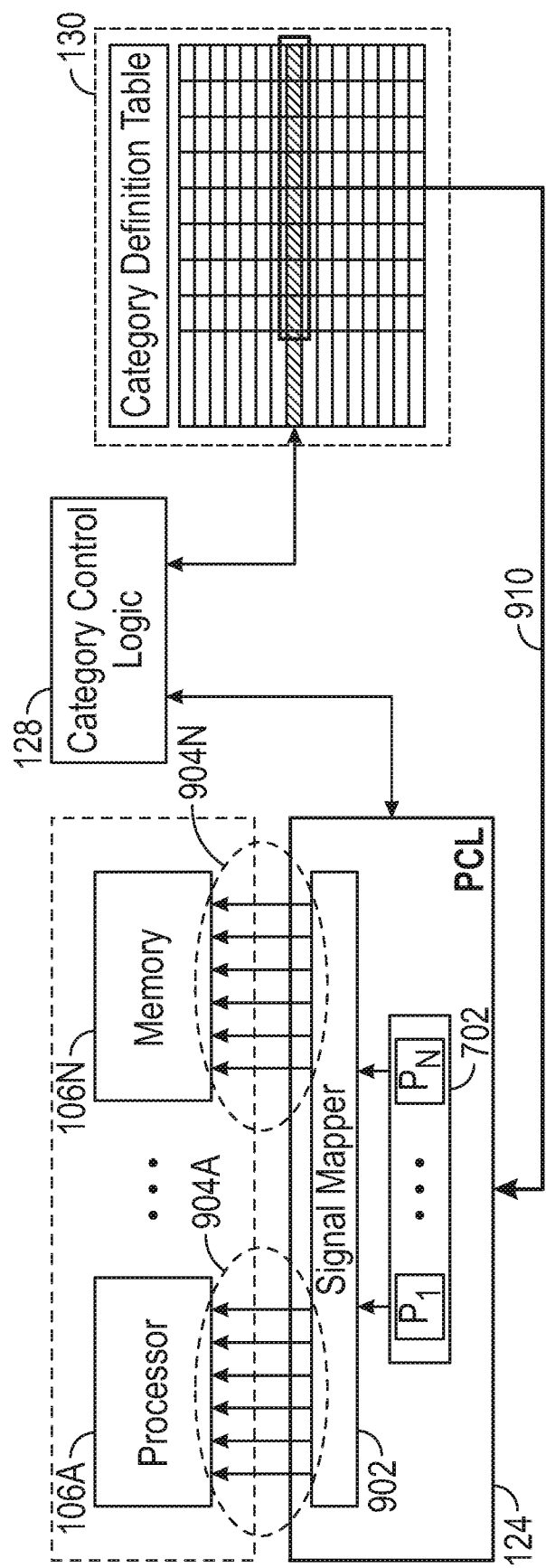
FIG. 9 illustrates an example parameter control logic, according to one embodiment.

FIG. 9 further illustrates components of the PCL 124, described relative to FIG. 2, according to one embodiment. As shown, the PCL 124 provides an interface between the CCL 128 and the CDT 130. In particular, the PCL 124 converts the configuration data passed from the CDT 130 into logic signals, so that the computing system 110 can switch its operation mode accordingly. For example, while some parameter values from the CDT can be directly mapped to specific logic switches in the system logic, other parameter values may have to be manipulated before they can be sent to logic. For example, some of the parameter values may have to be fed to multiple instances within the core logic. Additionally, some of the parameter values may involve setting values of other system parameters that are not a part of the CDT 130.

To handle these situations, the PCL 124 includes a signal mapper 902, which converts the parameter values 702 for a given category in the CDT 130 to a set of control signals 904A and 904N for the processor 106A and memory 106N, respectively. The PCL 124 may receive the parameter data values 702 from the CDT 130 via the interface 910 and may receive control information regarding the categories in the CDT 130 via the CCL 128. In addition, in some embodiments, the PCL 124 can trigger clock/power gating of unnecessary resources based on the configuration to reduce power consumption. For example, based on the CDT data, if there are opportunities to clock/power gate the system logic (e.g., the size of an internal queue is reduced to half), the PCL 124 can trigger clock/power gating to reduce power consumption.

In some cases, continuously performing dynamic classification (e.g., in real-time) may not be ideal for workloads whose behaviors rarely change over time, since performing a continuous classification can be resource intensive. In such cases, embodiments can optimize the classification logic by performing the classification for a given workload once (e.g., at the initial time the workload is run) and then using the same category number for that workload afterwards (e.g., when it is subsequently run). In some embodiments, if the category number is already known (e.g., from the same workload being repeated multiple times), an indication of the category number (referred to herein as a "category hint") can be directly sent to the CCL 128.

Figure 10:
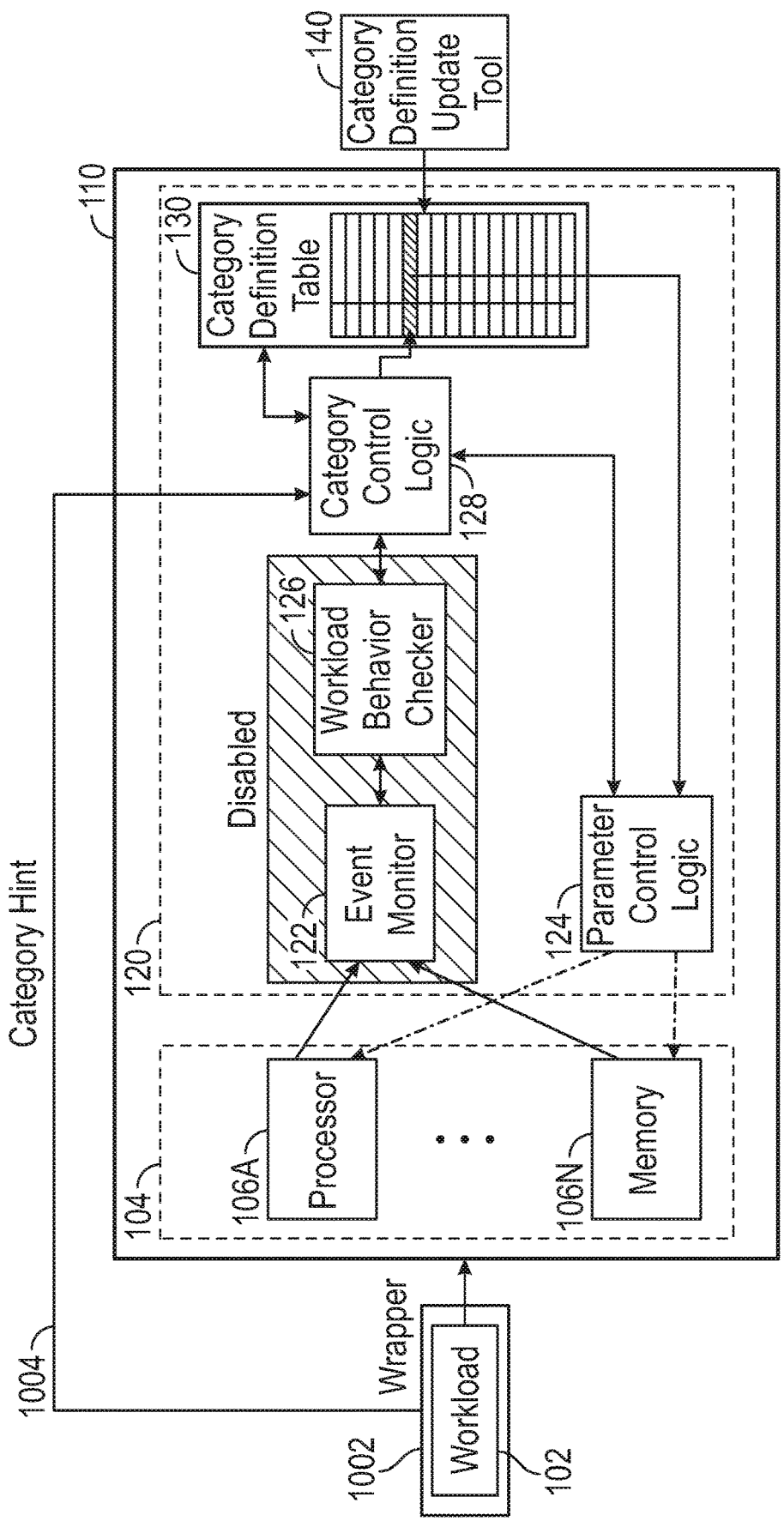
FIG. 10 illustrates components of the system architecture configured to perform an optimized classification of workloads, according to one embodiment.

FIG. 10 is a block diagram of the system architecture 100 configured to perform an optimized classification of workloads, according to one embodiment. In this embodiment, the system architecture 100 implements a wrapper component (or subroutine) 1002 that can determine whether the workload 102 has been previously run on the computing system 110. If so, the wrapper component 1002 can send an indication of the category number (also referred to as a "category hint") (corresponding to the set of optimal configuration parameters for the workload 102) directly to the CCL 128. In this embodiment, the EM 122 and WBC 126 can be disabled, which can reduce power consumption. Further, in some embodiments, if the workload 102 is a part of a well-known application (e.g., Standard Performance Evaluation Corporation (SPEC) Benchmark Suite), the user (e.g., vendor) can perform the initial classification and provide the "category hints" as part of the product package, so that the end-user can skip the initial classification and directly use the suggested "category hints."

Figure 11:
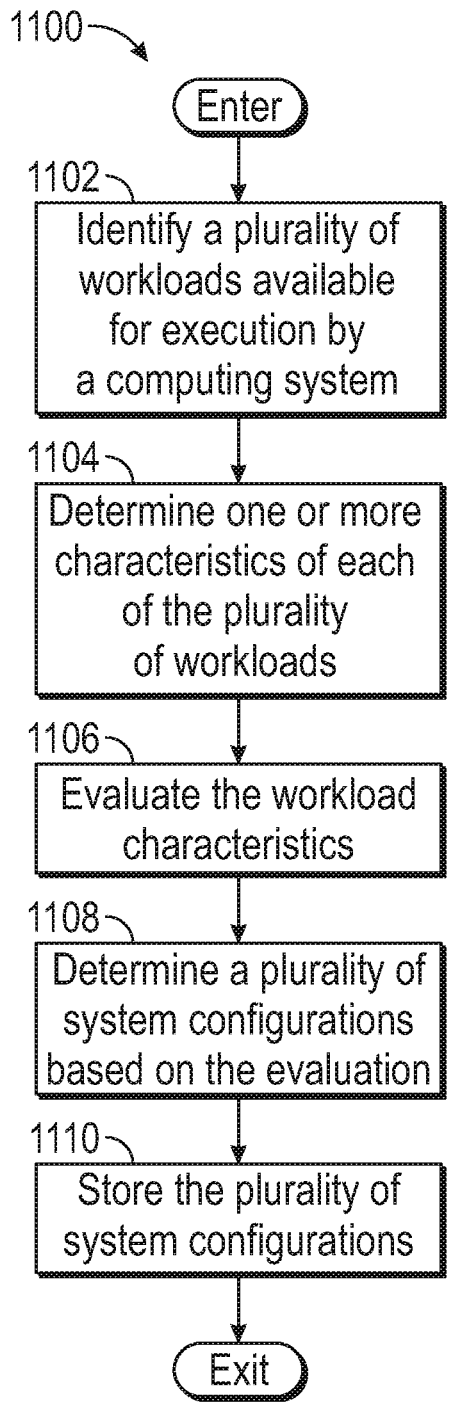
FIG. 11 is a flowchart of a method for determining categories of configuration parameters for a computing system, according to one embodiment.

FIG. 11 is a flowchart of a method 1100 for determining multiple categories of configuration parameters for a computing system 110, according to one embodiment. The method 1100 may be performed offline, e.g., during a design phase of the computing system 110.

The method 1100 may enter at block 1102, where multiple workloads available for execution by a computing system are identified. For example, a workload analysis and performance optimization procedure may be performed during the design phase of the computing system for a wide variety of workloads. At block 1104, one or more characteristics of each of the workloads is determined. Such characteristics can include, but are not limited to, the types of instructions, source dependency, cache access behavior, etc. At block 1106, the workload characteristics are evaluated and, at block 1108, multiple categories of parameter configurations (or system configurations) are determined based on the evaluation. In one embodiment, the operations at blocks 1106 and 1108 can be performed utilizing ML techniques. At block 1110, the categories of parameter configurations are stored in the computing system 110 (e.g., within firmware, such as pNOR).

Figure 12:
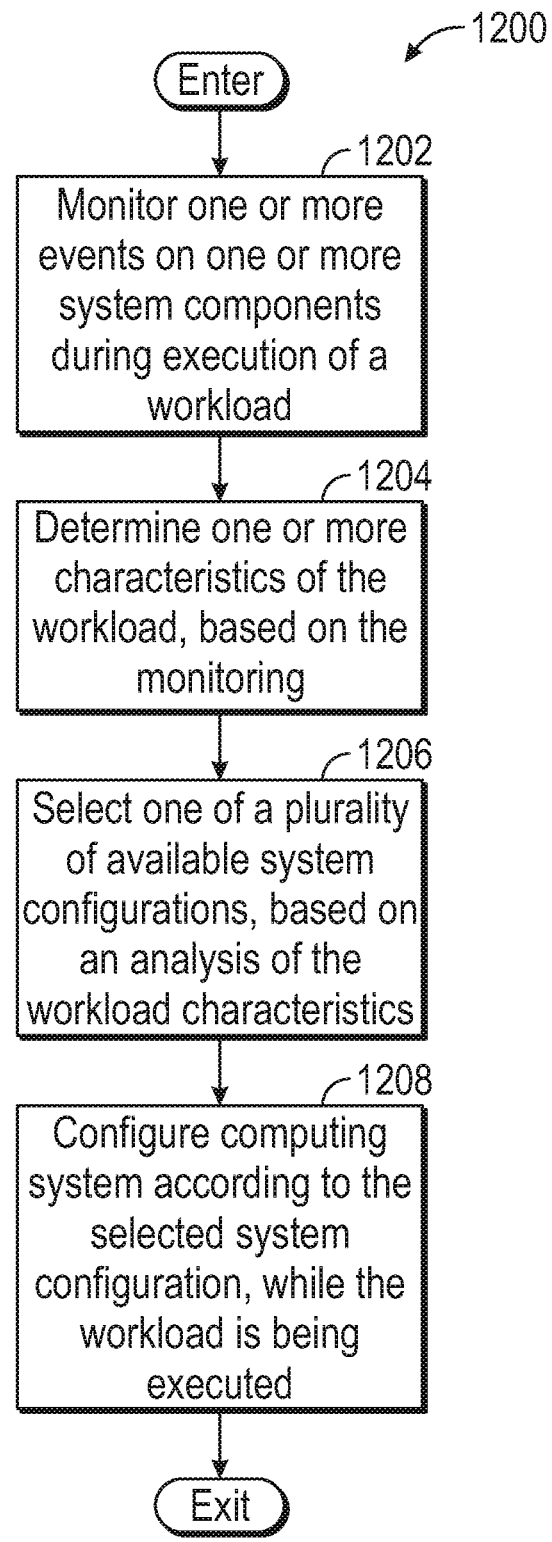
FIG. 12 is a flowchart of a method for dynamically adjusting a configuration of a computing system, according to one embodiment.

FIG. 12 is a flowchart of a method 1200 for dynamically adjusting a configuration of a computing system 110, based on workloads being run on the computing system 110, according to one embodiment. The method 1200 may be performed by one or more components of the optimization module 120.

The method 1200 may enter at block 1202, where the optimization module 120 monitors one or more events on one or more system components (e.g., system components 106) during execution of a workload (e.g., workload 102). At block 1204, the optimization module 120 determines one or more characteristics of the workload, based on the monitoring.

At block 1206, the optimization module 120 selects one of multiple system configurations (e.g., a particular category of configuration parameters), based on an analysis of the workload characteristics. In one embodiment, the optimization module 120 can select the system configuration based on: (i) computing a set of metrics (e.g., metrics 404) for the workload characteristics, (ii) determining, based on the set of metrics, which of the multiple system configurations satisfies one or more conditions related to performance of the computing system, and (iii) selecting one of the multiple system configurations that satisfies the one or more conditions. The optimization module can evaluate the set of metrics to determine which system configuration satisfies the one or more conditions, via fixed rules (e.g., mapping rules 502), searching a configurable table (e.g., configurable logic 504), which contains entries of search words that map to one or more system configurations, with a search word generated based on the set of metrics, or via a ML model (e.g., ML model 506). At block 1208, the optimization module 120 configures the computing system 110 according to the selected system configuration, while the workload is being executed.

In the embodiment with the configurable table, the optimization module 120 can generate a search input (e.g., $W_{in}$) based on the set of metrics, where the search input includes multiple search bits and where the value of each bit is based on a value of one of the set of metrics. As noted, for example, $W_{in}$ may include one or more "1", "0", and "x" bits (or combination of bits). The optimization module 120 can identify the search input in an entry of the configurable table, and select the system configuration corresponding to the search input in the identified entry of the table as the system configuration that satisfies the one or more conditions.

Figure 13:
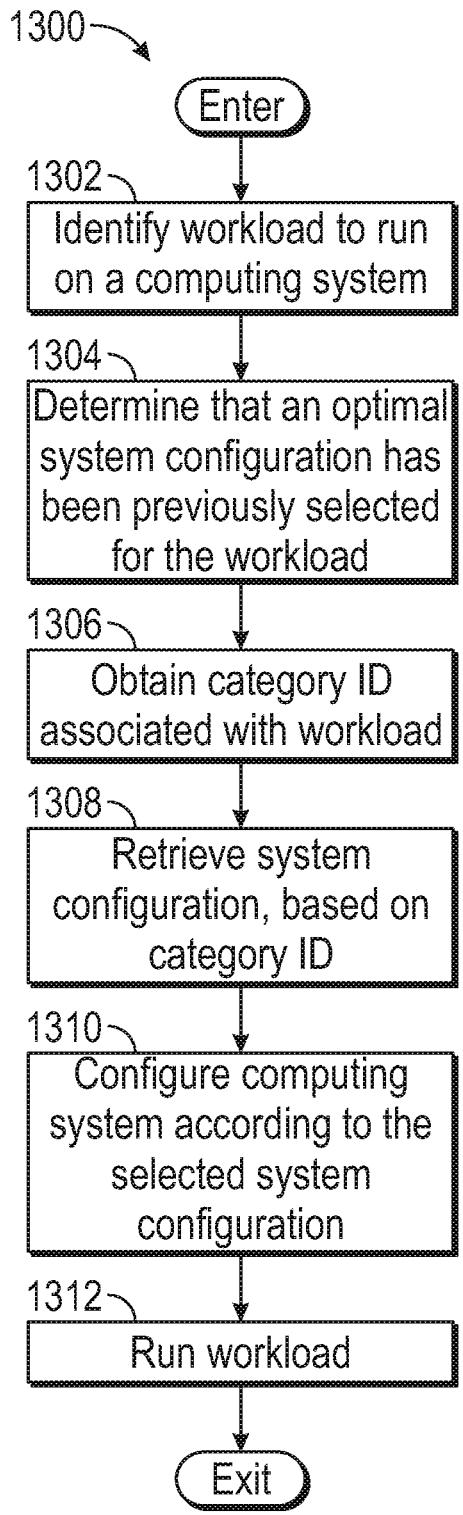
FIG. 13 is a flowchart of another method for dynamically adjusting a configuration of a computing system, according to one embodiment.

FIG. 13 is a flowchart of another method 1300 for dynamically adjusting a configuration of a computing system 110, based on a workload received by the computing system 110, according to one embodiment. The method 1300 may be performed by one or more components of the optimization module 120.

The method 1300 may enter at block 1302, where the optimization module 120 identifies a workload to run (or execute) on the computing system 110. At block 1304, the optimization module 120 determines that an optimal system configuration (e.g., category of configuration parameters) has been previously determined (or selected) for the workload, e.g., by the optimization module 120. At block 1306, the optimization module 120 obtains a category ID associated with the workload. At block 1308, the optimization module 120 retrieves the system configuration, based on the category ID. At block 1310, the optimization module 120 configures the computing system 110 according to the system configuration. At block 1312, the optimization module 120 executes (or runs) the workload on the computing system configured according to the system configuration.

Figure 14:
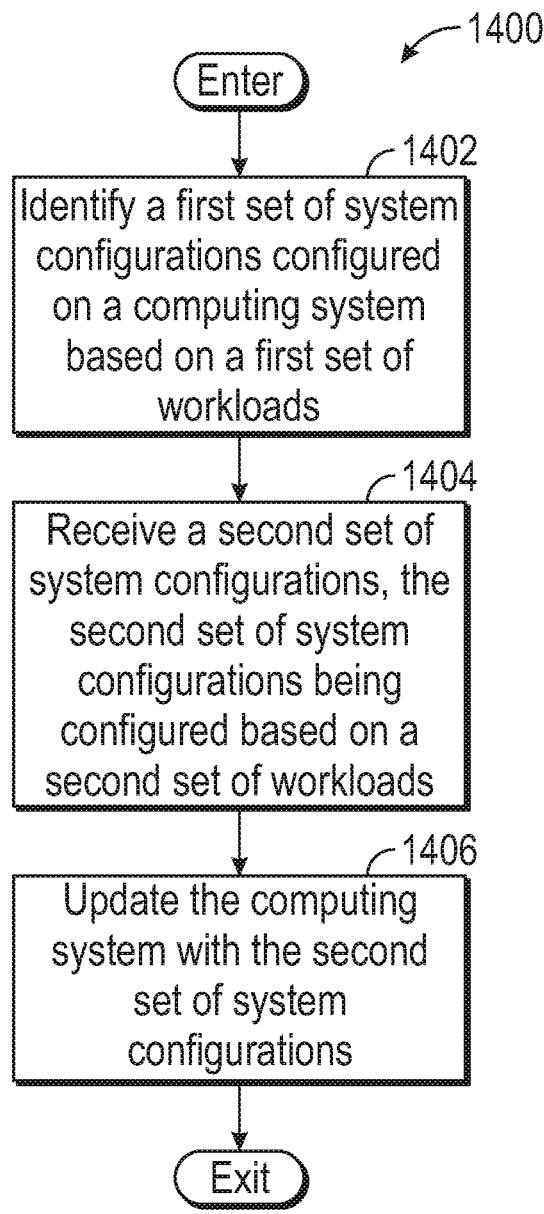
FIG. 14 is a flowchart of a method for performing a post-deployment update of configuration parameters in a computing system, according to one embodiment.

FIG. 14 is a flowchart of a method 1400 for performing a post-deployment update of configuration parameters in a computing system 110, according to one embodiment. The method 1400 may be performed by the optimization module 120.

The method 1400 may enter at block 1402, where the optimization module 120 identifies a first set of configuration parameters configured on the computing system 110 for a first set of workloads. At block 1404, the optimization module 120 receives a second set of configuration parameters, where the second set of configuration parameters are configured based on a second set of workloads. At block 1406, the optimization module 120 updates the computing system with the second set of configuration parameters.

Figure 15:
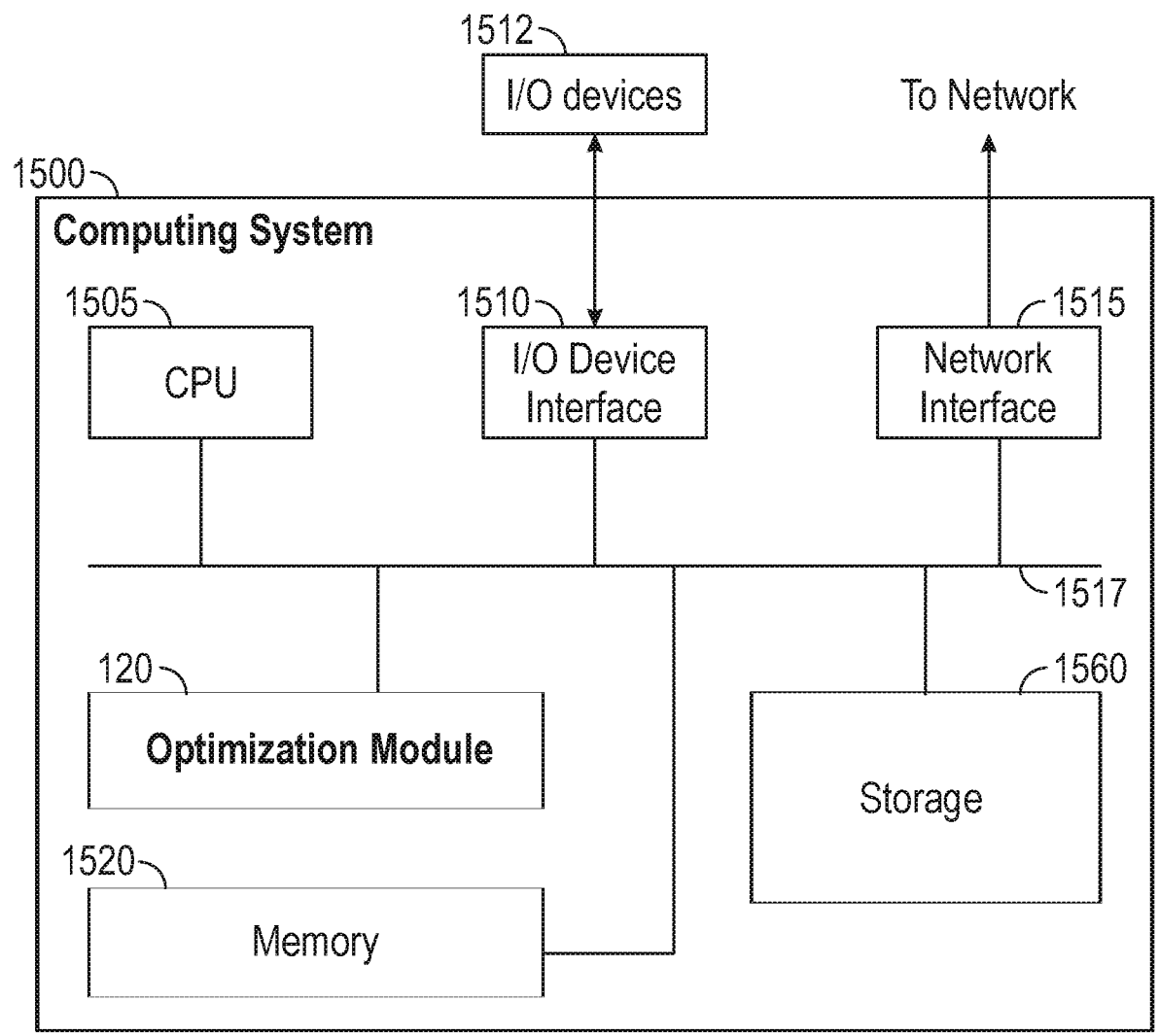
FIG. 15 illustrates an example computing system with one or more components of an optimization module, according to one embodiment.

FIG. 15 illustrates a computing system 1500 configured to perform device onboarding, according to one embodiment. As shown, the computing system 1500 includes, without limitation, a central processing unit (CPU) 1505, a network interface 1515, a memory 1520, storage 1560, and optimization module 120, each connected to a bus 1517. The computing system 1500 may also include an I/O device interface 1510 connecting I/O devices 1512 (e.g., keyboard, mouse, and display devices) to the computing system 1500. Further, in context of this disclosure, the computing elements shown in the computing system 1500 may correspond to a physical computing system (e.g., a system in a data center) or may be a virtual computing instance executing within a computing cloud.

The CPU 1505 retrieves and executes programming instructions stored in the memory 1520 as well as stores and retrieves application data residing in the memory 1520. The interconnect 1517 is used to transmit programming instructions and application data between CPU 1505, I/O devices interface 1510, storage 1560, network interface 1515, and memory 1520. Note CPU 1505 is included to be representative of a single CPU, multiple CPUs, a single CPU having multiple processing cores, and the like. Memory 1520 is generally included to be representative of a random access memory. The storage 1560 may be a disk drive storage device. Although shown as a single unit, storage 1560 may be a combination of fixed and/or removable storage devices, such as fixed disc drives, removable memory cards, or optical storage, network attached storage (NAS), or a storage area-network (SAN).

The optimization module 120, which is described in more detail above, enables the computing system 1500 to perform workload-based dynamic optimization of one or more components (e.g., CPU 1505, memory 1520, etc.) of the computing system 1500. As noted, this workload-based dynamic optimization can be done to significantly reduce the amount of time/effort spent during the design phases, as well as post-silicon configuration tuning. In one embodiment, the optimization module 120 is a logic component implemented within the computing system 1500. In one embodiment, one or more components of the optimization module 120 (e.g., EM 122, PCL 124, WBC 126, CCL 128, CDT 130, etc.) can be included (e.g., as unique copies) within each CPU 1505. In one embodiment, one or more components of the optimization module 120 (e.g., CCL 128, CDT 130, etc.) could be located in storage 1560 or memory 1520.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., category definition update tool 140) or related data available in the cloud. For example, the category definition update tool 140 could execute on a computing system in the cloud and provide category definition updates (e.g., category definition updates 802) to the computing system 110. In such a case, one or more category definitions could be stored at a storage location in the cloud and retrieved by the category definition update tool 140. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method performed by a computing system, the method comprising:
    determining, during execution of a first workload on the computing system, one or more characteristics of the first workload;
    selecting a first system configuration from a first plurality of system configurations available for the computing system, based on the one or more characteristics of the first workload, comprising:
        computing a set of metrics for the one or more characteristics of the first workload;
        determining, based on the set of metrics, that the first system configuration satisfies one or more conditions, wherein determining that the first system configuration satisfies the one or more conditions comprises:
            generating a search input based on the set of metrics, the search input comprising a plurality of bits, where a value of each bit is based on a value of one of the set of metrics;
            identifying the search input in an entry of a table that maps different search inputs to one or more of the first plurality of system configurations; and
            determining that the first system configuration corresponds to the search input in the identified entry of the table; and
        selecting the first system configuration; and
    adjusting a current configuration of the computing system according to the selected first system configuration, during the execution of the first workload.

2. The method of claim 1, wherein the one or more conditions comprises at least one of: a threshold amount of resources in the computing system, a threshold amount of power consumption by the computing system, a threshold number of instructions retired in a processor in the computing system, or a threshold number of cache hits by the processor in the computing system.

3. The method of claim 1, wherein adjusting the current configuration of the computing system comprises adjusting an operation mode of the computing system being used to execute the first workload, based on the selected first system configuration.

4. The method of claim 1, further comprising:
    receiving a second workload to execute on the computing system;
    prior to executing the second workload:
        determining that the second workload is associated with a second system configuration of the first plurality of system configurations; and
        modifying the current configuration of the computing system according to the second system configuration; and
    after modifying the current configuration of the computing system according to the second system configuration, executing the second workload on the computing system.

5. The method of claim 1, wherein each of the first plurality of system configurations comprises a set of configuration parameters for at least one of a processor or a memory in the computing system.

6. The method of claim 1, wherein the first plurality of system configurations are determined based on an analysis of a first plurality of different workloads during a design phase of the computing system.

7. The method of claim 6, further comprising:
    receiving a second plurality of system configurations after deployment of the computing system, the second plurality of system configurations being configured based on a second plurality of different workloads; and
    updating the computing system with the second plurality of system configurations.

8. A computing system, comprising:
    at least one processor; and
    a memory containing one or more applications, which when executed by the processor, performs an operation comprising:
        determining, during execution of a first workload on the computing system, one or more characteristics of the first workload;
        selecting a first system configuration from a first plurality of system configurations available for the computing system, based on the one or more characteristics of the first workload, comprising:

computing a set of metrics for the one or more characteristics of the first workload;
determining, based on the set of metrics, that the first system configuration satisfies one or more conditions, wherein determining that the first system configuration satisfies the one or more conditions comprises:
generating a search input based on the set of metrics, the search input comprising a plurality of bits, where a value of each bit is based on a value of one of the set of metrics;
identifying the search input in an entry of a table that maps different search inputs to one or more of the first plurality of system configurations; and
determining that the first system configuration corresponds to the search input in the identified entry of the table; and
selecting the first system configuration; and
adjusting a current configuration of the computing system according to the selected first system configuration, during the execution of the first workload.

9. The computing system of claim 8, the operation further comprising:
receiving a second workload to execute on the computing system;
prior to executing the second workload:
determining that the second workload is associated with a second system configuration of the first plurality of system configurations; and
modifying the current configuration of the computing system according to the second system configuration; and
after modifying the current configuration of the computing system according to the second system configuration, executing the second workload on the computing system.

10. The computing system of claim 8, wherein the one or more conditions comprises at least one of: a threshold amount of resources in the computing system, a threshold amount of power consumption by the computing system, a threshold number of instructions retired in the at least one processor, or a threshold number of cache hits by the at least one processor.

11. The computing system of claim 8, wherein adjusting the current configuration of the computing system comprises adjusting an operation mode of the computing system being used to execute the first workload, based on the selected first system configuration.

12. The computing system of claim 8, wherein each of the first plurality of system configurations comprises a set of configuration parameters for at least one of (i) the at least one processor or (ii) the memory.

13. The computing system of claim 8, wherein the first plurality of system configurations are determined based on an analysis of a first plurality of different workloads during a design phase of the computing system.

14. The computing system of claim 13, the operation further comprising:
receiving a second plurality of system configurations after deployment of the computing system, the second plurality of system configurations being configured based on a second plurality of different workloads; and
updating the computing system with the second plurality of system configurations.

15. A computer-readable storage medium having computer-readable program code embodied therewith, the computer-readable program code executable by one or more computer processors to perform an operation comprising:
determining, during execution of a first workload on a computing system, one or more characteristics of the first workload;
selecting a first system configuration from a plurality of system configurations available for the computing system, based on the one or more characteristics of the first workload, comprising:
computing a set of metrics for the one or more characteristics of the first workload;
determining, based on the set of metrics, that the first system configuration satisfies one or more conditions, wherein determining that the first system configuration satisfies the one or more conditions comprises:
generating a search input based on the set of metrics, the search input comprising a plurality of bits, where a value of each bit is based on a value of one of the set of metrics;
identifying the search input in an entry of a table that maps different search inputs to one or more of the plurality of system configurations; and
determining that the first system configuration corresponds to the search input in the identified entry of the table; and
selecting the first system configuration; and
adjusting a current configuration of the computing system according to the selected first system configuration, during the execution of the first workload.

16. The computer-readable storage medium of claim 15, the operation further comprising:
receiving a second workload to execute on the computing system;
prior to executing the second workload:
determining that the second workload is associated with a second system configuration of the plurality of system configurations; and
modifying the current configuration of the computing system according to the second system configuration; and
after modifying the current configuration of the computing system according to the second system configuration, executing the second workload on the computing system.

17. The computer-readable storage medium of claim 15, wherein the one or more conditions comprises at least one of: a threshold amount of resources in the computing system, a threshold amount of power consumption by the computing system, a threshold number of instructions retired in a processor in the computing system, or a threshold number of cache hits by the processor in the computing system.

18. The computer-readable storage medium of claim 15, wherein adjusting the current configuration of the computing system comprises adjusting an operation mode of the computing system being used to execute the first workload, based on the selected first system configuration.

19. The computer-readable storage medium of claim 15, wherein each of the plurality of system configurations comprises a set of configuration parameters for at least one of a processor or a memory in the computing system.

20. The computer-readable storage medium of claim 15, wherein the plurality of system configurations are determined based on an analysis of a plurality of different workloads during a design phase of the computing system.

* * * * *